(12) United States Patent
Hu et al.

(10) Patent No.: US 8,144,665 B2
(45) Date of Patent: Mar. 27, 2012

(54) RESOURCE RELEASE CONTROL METHOD, COMMUNICATION SYSTEM AND DEVICE

(75) Inventors: Weihua Hu, Shanghai (CN); Yanping Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/182,274

(22) Filed: Jul. 13, 2011

(65) Prior Publication Data

US 2011/0261780 A1    Oct. 27, 2011

Related U.S. Application Data

(63) Continuation of application No. 12/779,655, filed on May 13, 2010, which is a continuation of application No. PCT/CN2009/070159, filed on Jan. 15, 2009.

(30) Foreign Application Priority Data

Jan. 31, 2008  (CN) .......................... 2008 1 0006802

(51) Int. Cl.
 *H04W 4/00*  (2009.01)
 *H04W 36/00*  (2009.01)
 *H04J 3/16*   (2006.01)

(52) U.S. Cl. .................. 370/331; 370/467; 455/435.1; 455/435.2; 455/438

(58) Field of Classification Search .................. 370/328, 370/331–337, 466, 467; 455/435.1, 435.2, 455/436–444
See application file for complete search history.

(56) References Cited

U.S. PATENT DOCUMENTS

| 2003/0193911 A1 | 10/2003 | Zhao et al. |
| 2010/0118790 A1 | 5/2010 | Guo et al. |
| 2010/0267388 A1 | 10/2010 | Olsson |

FOREIGN PATENT DOCUMENTS

| CN | 1429465 A | 7/2003 |
| CN | 1595863 A | 3/2005 |
| CN | 1725717 A | 1/2006 |

(Continued)

OTHER PUBLICATIONS

"3GPP TS 23.060—3rd Generation Partnership Project; Technical Specification Group Services and System Aspects; General Packet Radio Service (GPRS); Service description; Stage 2 (Release 7)," Dec. 2007, Version 7.6.0, $3^{rd}$ Generation Partnership Project, Valbonne, France.

(Continued)

*Primary Examiner* — Ricky Ngo
*Assistant Examiner* — Paul H Masur
(74) *Attorney, Agent, or Firm* — Leydig, Voit & Mayer, Ltd.

(57) ABSTRACT

A resource release control method, a communication system, and a device are configured to delete a bearer context on an original-side heterogeneous-system management network element (NE) even if a target-side management NE does not support interaction with a serving gateway (S-GW) and does not support an idle mode signaling reduction (ISR) mechanism. The resource release control method includes: acquiring version information of a target-side management NE, when a user equipment (UE) activating an ISR mechanism is handed over from an original-side network to a target-side network; and deleting a bearer of an original-side heterogeneous-system management NE, if the version information indicates that the target-side management NE does not interact with an S-GW and does not support the ISR mechanism. Meanwhile, a communication system and a relevant device are also provided.

8 Claims, 8 Drawing Sheets

FOREIGN PATENT DOCUMENTS

| | | |
|---|---|---|
| CN | 1756427 A | 4/2007 |
| CN | 1968523 A | 5/2007 |
| CN | 101001460 A | 7/2007 |
| CN | 101068442 A | 11/2007 |
| CN | 201004704 Y | 1/2008 |
| CN | 101282582 A | 10/2008 |
| CN | 101330751 A | 12/2008 |
| CN | 101494882 A | 7/2009 |
| CN | 101472312 B | 7/2010 |

OTHER PUBLICATIONS

"3GPP TS 23.401—3rd Generation Partnership Project; Technical Specification Group Services and System Aspects; General Packet Radio Service (GPRS) enhancements for Evolved Universal Terrestrial Radio Access Network (E-UTRAN) access (Release 8)," Dec. 2007, Version 8.0.0, 3$^{rd}$ Generation Partnership Project, Valbonne, France.

"3GPP TSG SA WG2 Meeting #60—Procedure of ISR Deactivation," Oct. 8-12, 2007, Huawei, Kobe, Japan.

International Search Report in corresponding PCT Application No. PCT/CN2009/070159 (Apr. 23, 2009).

Written Opinion in corresponding PCT Application No. PCT/CN2009/070159 (Apr. 23, 2009).

Extended European Search Report in corresponding European Application No. 09708079.0 (Dec. 15, 2010).

"3GPP TS 23.060—3rd Generation Partnership Project; Technical Specification Group Services and System Aspects; General Packet Radio Service (GPRS); Service description; Stage 2 (Release 7)," Mar. 2007, Version 7.4.0, 3$^{rd}$ Generation Partnership Project, Valbonne, France.

"TD S2—072670—Idle-mode IRAT Mobility between LTE and 2G/3G with idle-mode Signal Reduction," 3GPP TSG SA WG2 Architecture—S2#58, Motorola, Jun. 25-29, 2007.

"TD S2-074401—Idle State Signalling Reduction," 8.2.8, 3GPP TSG WA WG2 Meeting #60, Oct. 8-12, 2007, Hauwei, Kobe, Japan.

"T S2-074967—Idle State Reduction Function Principle," 8.2.8, 3GPP TSG SA WG2 Meeting #61, Nov. 12-16, 2007, ZTE, Ljubljana, Slovenia.

"TD S2-074968—ISR Activation," 8.2.8, 3GPP TSG SA WG2 Meeting #61, Nov. 12-16, 2007, ZTE, Ljubljana, Slovenia.

Image File Wrapper in corresponding U.S. Appl. No. 12/779,655 (Feb. 14, 2012).

RESOURCE RELEASE CONTROL METHOD, COMMUNICATION SYSTEM AND DEVICE

CROSS-REFERENCE TO RELATED APPLICATIONS

This application is a continuation of U.S. patent application Ser. No. 12/779,655, filed on May 13, 2010, which is a continuation of International Application No. PCT/CN2009/070159, filed on Jan. 15, 2009. The International Application claims priority to Chinese Patent Application No. 200810006802.8, filed on Jan. 31, 2008. The aforementioned patent applications are hereby incorporated by reference in their entireties.

FIELD OF THE TECHNOLOGY

The present application relates to the field of communication, and more particularly to a resource release control method, a communication system, and a device.

BACKGROUND

A core network of a wireless evolution network, that is, a system architecture evolution (SAE) includes three logic functions, namely, a mobility management entity (MME), a serving gateway (S-GW), and a packet data network gateway (P-GW).

The MME is responsible for non-access stadium (NAS) signaling encryption, roaming, and tracking, assignment of temporary subscriber identities, security functions, and the like, and is corresponding to a control-plane part of a serving general packet radio service (GPRS) supporting node (SGSN) in a current universal mobile telecommunications system (UMTS).

The S-GW is responsible for local mobility anchor points, internal mobility anchor points in a third generation partnership project (3GPP) system, as well as lawful interception of related information.

The P-GW is responsible for policy enforcement and charging, as well as lawful interception of related functions.

A home subscriber server (HSS) is adapted to store subscriber subscription information.

In order to reduce the signaling overhead, currently, an idle mode signaling reduction (ISR) solution is proposed. In the solution, a user equipment (UE) registers to two different access networks, and the HSS stores information of core network elements (NEs) of the two access technologies.

Under the double registration mechanism, after an original-side MME establishes the ISR mechanism with the SGSN, if the UE moves to a new MME or SGSN, the UE will initiate a tracking area update (TAU) or routing area update (RAU) process. If a target-side MME or SGSN does not support the ISR mechanism, the target-side MME or SGSN does not carry an ISR activation indication in a bearer update request sent to the S-GW. After receiving the bearer update request, the S-GW deletes a bearer context thereof and requests the original-side MME or SGSN to delete the bearer context.

However, in the technical solution, if a version property (for example, Pre-Rel-8 version) of the target-side MME or SGSN indicates that the target-side MME or SGSN does not support interaction with the S-GW and does not support the ISR mechanism, when the UE moves to the coverage of the target-side MME or SGSN, as the target-side MME or SGSN cannot perform signaling interaction with the S-GW, it is impossible to control the S-GW to delete the bearer context of the original-side MME or SGSN according to the solution in the prior art.

SUMMARY OF THE INVENTION

The embodiments below are directed to a resource release control method, a communication system, and a device, which are capable of deleting a bearer of an original-side heterogeneous-system management NE even if a target-side management NE does not support interaction with an S-GW and does not support an ISR mechanism.

An embodiment provides a resource release control method. When a UE activating an ISR mechanism is handed over from an original-side network to a target-side network, the method includes: acquiring version information of a target-side management NE; and deleting a bearer of an original-side heterogeneous-system management NE, if the version information indicates that the target-side management NE does not interact with an S-GW and does not support the ISR mechanism.

Another embodiment provides a communication system, which includes an original-side homogeneous-system management NE and an original-side heterogeneous-system management NE. The original-side homogeneous-system management NE is configured to acquire version information of a target-side management NE when a UE activating an ISR mechanism is handed over from an original-side network to a target-side network, and send a delete bearer message if the version information indicates that the target-side management NE does not interact with an S-GW and does not support the ISR mechanism. The original-side heterogeneous-system management NE is configured to receive the delete bearer message, and delete a bearer thereof according to the delete bearer message.

Another embodiment provides a mobility management NE, which is connected to a radio access network (RAN), and configured to manage a mobility state of a subscriber. The mobility management NE includes an acquisition unit, a determination unit, and a bearer deletion control unit. The acquisition unit is configured to acquire version information of a peer-end management NE. The determination unit is configured to determine whether the version information of the peer-end management NE acquired by the acquisition unit indicates that the peer-end management NE does not support interaction with an S-GW and does not support an ISR mechanism. The bearer deletion control unit is configured to execute a bearer deletion process if a determination result of the determination unit is that the peer-end management NE does not support interaction with the S-GW and does not support the ISR mechanism.

Another embodiment provides a GW device, which is connected to an RAN and a packet data network (PDN), and configured to bear subscriber data transmission between the RAN and the PDN. The GW device includes a receiving unit and a deletion control unit. The receiving unit is configured to receive a delete bearer message sent from an original-side homogeneous-system management NE. The deletion control unit is configured to instruct an original-side heterogeneous-system management NE to delete a bearer of the original-side heterogeneous-system management NE according to the delete bearer message.

It can be seen from the above technical solutions that the embodiments have the following advantages.

In the embodiments, after the version information of the target-side management NE is acquired, if it is determined that the version information indicates that the target-side management NE does not interact with the S-GW and does not support the ISR mechanism, the bearer of the original-side heterogeneous-system management NE is deleted according to the version information. Therefore, the embodiments enable deletion of the bearer of the original-side heterogeneous-system management NE, even if the target-side management NE does not support interaction with the S-GW and does not support the ISR mechanism.

BRIEF DESCRIPTION OF THE DRAWINGS

FIG. 10 is a schematic view of a GW device according to an.

DETAILED DESCRIPTION OF THE EMBODIMENTS

The embodiments below provide a resource release control method, a communication system, and a device, which are adapted to delete a bearer context of an original-side heterogeneous-system management NE even if a target-side management NE does not support interaction with an S-GW and does not support an ISR mechanism.

The resource release control method according to an embodiment includes:

acquiring version information of a target-side management NE, when a UE activating an ISR mechanism is handed over from an original-side network to a target-side network; and deleting a bearer of an original-side heterogeneous-system management NE, if the version information indicates that the target-side management NE does not interact with an S-GW and does not support the ISR mechanism.

In an embodiment, after the version information of the target-side management NE is acquired, if it is determined that the version information indicates that the target-side management NE does not interact with the S-GW and does not support the ISR mechanism, the bearer context of the original-side heterogeneous-system management NE is deleted according to the version information. It can be noted that, in subsequent embodiments, the deletion of the bearer of the original-side heterogeneous-system management NE refers to the deletion of the bearer context of the original-side heterogeneous-system management NE.

Therefore, the embodiment enables deletion of the bearer context of the original-side heterogeneous-system management NE, even if the target-side management NE does not support interaction with the S-GW and does not support the ISR mechanism.

In this embodiment and subsequent embodiments, the original-side heterogeneous-system management NE refers to an MME where a subscriber is originally located, an original-side homogeneous-system management NE refers to an SGSN establishing the ISR mechanism with the original-side MME, and the target-side management NE refers to an SGSN where the subscriber is located after moving.

It can be understood that, in practical applications, the original-side heterogeneous-system management NE, the original-side homogeneous-system management NE, and the target-side management NE may also be other situations, for example, if the target-side management NE is an MME, the original-side heterogeneous-system management NE is an SGSN, and the original-side homogeneous-system management NE is an MME.

Figure 1:
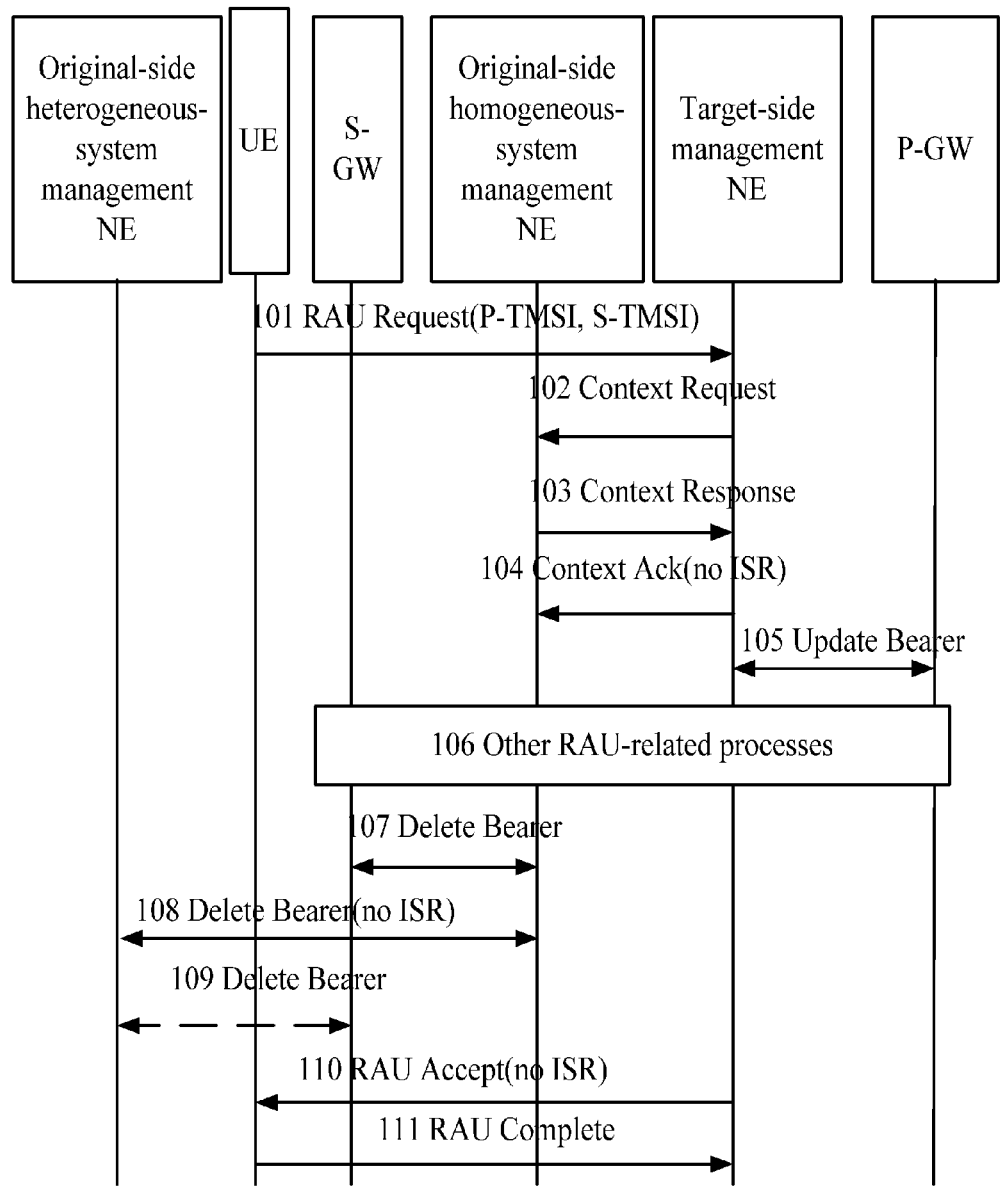
FIG. 1 is a flow chart of a resource release control method according to a first embodiment.

For ease of understanding, the embodiments are described in detail below with reference to the accompanying drawings. Referring to FIG. 1, in the resource release control method according to a first embodiment, an original-side homogeneous-system management NE interacts with a target-side management NE to acquire version information of the target-side management NE, then sends a delete bearer message to a corresponding original-side heterogeneous-system management NE according to address information of the original-side heterogeneous-system management NE locally stored in the original-side homogeneous-system management NE, so that the original-side heterogeneous system deletes a bearer context thereof.

The resource release control method according to the first embodiment includes the following steps.

In step 101, a UE sends an RAU Request message to the target-side management NE.

When the UE moves to the coverage of another MME or SGSN, the UE sends an RAU Request message carrying a packet temporary mobile subscriber identity (P-TMSI) and a globally unique temporary identity (GUTI) to the target-side management NE, so as to request to register with the target-side management NE.

In step 102, the target-side management NE sends a Context Request message to an original-side homogeneous-system management NE.

After receiving the RAU Request message sent from the UE, the target-side management NE sends the Context Request message to the original-side homogeneous-system management NE, so as to request context information.

In this embodiment, before step 102, the target-side management NE performs protocol version detection with the original-side homogeneous-system management NE, so that the original-side homogeneous-system management NE acquires a General Packet Radio Service Tunneling Protocol (GTP) version of the target-side management NE. If the GTP version is an old version such as GTP V0 or GTP V1, the original-side homogeneous-system management NE acquires that the version information of the target-side management NE is a Pre-Rel-8 version, that is, the target-side management NE does not support interaction with an S-GW and does not support an ISR mechanism. In this embodiment and subsequent embodiments, the Pre-Rel-8 version is taken as an example for description; however, it can be understood that, in practical applications, the version information may also be other versions that do not support interaction with the S-GW and do not support the ISR mechanism.

The situation where the original-side homogeneous-system management NE acquires the version information of the target-side management NE by detecting the GTP information is introduced above. It can be understood that, the target-side management NE may also notify the version information thereof to the original-side homogeneous-system management NE through the Context Request message in step 102. In specific implementations, a field adapted to indicate the version information of the target-side management NE is extended in the Context Request message, or an identity adapted to indicate the version information is added in an existing field, or other indication methods are used.

The above description relates to explicit indication, that is, the target-side management NE indicates the version information thereof (that is, the target-side management NE does not support interaction with the S-GW and does not support the ISR mechanism) by using an explicit information entity (IE). It can be understood that, the target-side management NE may also indicate the version information thereof in an implicit manner. For example, if the target-side management NE does not carry a "version" field in a signaling sent to the original-side homogeneous-system management NE or the original-side heterogeneous-system management NE, or a value in the field is null, it indicates by default that the target-side management NE does not support interaction with the S-GW and does not support the ISR mechanism.

In step 103, the original-side homogeneous-system management NE sends a Context Response message to the target-side management NE, the context response message includes the context information.

In step 104, the target-side management NE sends a Context Ack message to the original-side homogeneous-system management NE.

In this embodiment, in addition to sending the version information of the target-side management NE to the original-side homogeneous-system management NE through the Context Request message in step 102, the target-side management NE may also send the version information thereof to the original-side homogeneous-system management NE through the Context Ack message in step 104, and the specific sending process is identical to that using the Context Request message, so the details will not be described herein again.

In step 105, the target-side management NE sends a message to a P-GW to update a bearer context.

In step 106, other RAU-related processes are executed.

In step 107, the original-side homogeneous-system management NE notifies the S-GW to delete the bearer.

In this embodiment, the original-side homogeneous-system management NE sends a delete bearer message to the S-GW, in which the delete bearer message instructs the S-GW to delete the bearer thereof. It can be noted that, in this embodiment and subsequent embodiments, the operation that the S-GW deletes the bearer thereof refers to that the S-GW deletes a bearer context thereof and releases bearer resources.

After receiving the delete bearer message sent from the original-side homogeneous-system management NE, the S-GW deletes the bearer context thereof and releases the bearer resources.

In step 108, the original-side homogeneous-system management NE notifies the original-side heterogeneous-system management NE to delete a bearer context.

In this embodiment, since the original-side homogeneous-system management NE has acquired the version information of the target-side management NE from the target-side management NE through the GTP information, or the Context Request message in step 102, or the Context Ack message in step 104, the original-side homogeneous-system management NE can notify the original-side heterogeneous-system management NE to delete the bearer context thereof.

In this embodiment, when the ISR mechanism is activated, the original-side homogeneous-system management NE and the original-side heterogeneous-system management NE store information about each other, for example, control-plane information, in which the control-plane information includes address information of a peer end.

In this case, the original-side homogeneous-system management NE may acquire the address information of the original-side heterogeneous-system management NE according to the pre-stored information, and send a delete bearer message to the original-side heterogeneous-system management NE according to the address information. A cause value for deleting the bearer being "the target-side management NE does not support the ISR mechanism" may be carried in the delete bearer message.

It can be noted that, step 108 may be executed at an appropriate time after the Context Ack message sent from the target-side management NE is received, for example, when a timer times out, that is, a next process is not triggered in a preset period of time after the Context Ack message is received.

In step 109, the original-side heterogeneous-system management NE deletes a local bearer related to the UE.

After receiving the delete bearer message, the original-side heterogeneous-system management NE deletes the local bearer context related to the UE.

In this embodiment, the original-side heterogeneous-system management NE may also notify the S-GW to delete the bearer. It can be noted that, the operation that the S-GW deletes the bearer here has the same meaning as the operation that the S-GW deletes the bearer in step 107, that is, also refers to that the S-GW deletes a bearer context thereof and releases bearer resources.

Step 107 and step 109 may be implemented in combination, so as to delete the bearer context of the S-GW, and completely release the related bearer resources. For example, bearer resources may be allocated between the S-GW and the original-side homogeneous-system management NE, and likewise, bearer resources may also be allocated between the S-GW and the original-side heterogeneous-system management NE. If the delete bearer request in step 107 only requests the S-GW to release the bearer resources between the S-GW and the original-side homogeneous-system management NE, the original-side heterogeneous system can further notify the S-GW to delete the bearer context and release the bearer resources between the S-GW and the original-side heterogeneous-system management NE in step 109. It can be understood that, if no bearer resources are allocated between the S-GW and the original-side heterogeneous system, and the S-GW has deleted the bearer context thereof and released the bearer resources between the S-GW and the original-side homogeneous-system management NE according to the instruction in step 107, the original-side heterogeneous-system management NE may not notify the S-GW to delete the bearer in step 109.

In step 110, the target-side management NE sends an RAU Accept message to the UE.

In step 111, the UE sends an RAU Complete message to the target-side management NE.

Figure 2:
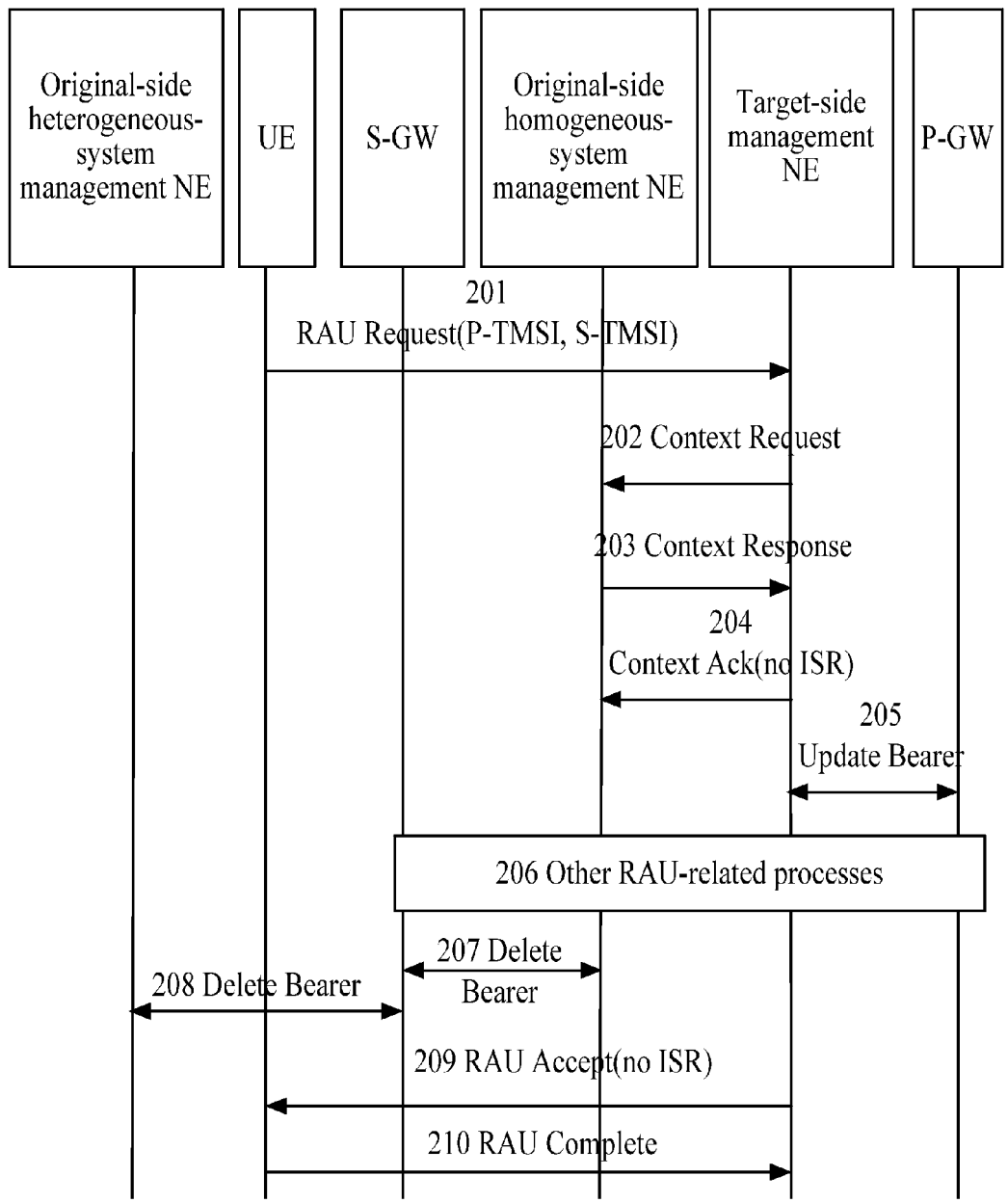
FIG. 2 is a flow chart of the resource release control method according to a second embodiment.

In this embodiment, after acquiring the version information of the target-side management NE, the original-side homogeneous-system management NE sends the delete bearer message to the corresponding original-side heterogeneous-system management NE according to the locally stored address information, so that the original-side heterogeneous-system management NE deletes the bearer context thereof. It can be understood that, the original-side homogeneous-system management NE may also delete the bearer context of the original-side heterogeneous-system management NE through the S-GW. Specifically, referring to FIG. 2, in the resource release control method according to a second embodiment, after acquiring the version information of the target-side management NE, the original-side homogeneous-system management NE sends the delete bearer message to the S-GW, and then the S-GW controls the original-side heterogeneous-system management NE to delete the bearer context thereof.

The resource release control method according to the second embodiment includes the following steps.

In step 201, a UE sends an RAU Request message to the target-side management NE.

When the UE moves to the coverage of another MME or SGSN, the UE sends an RAU Request message carrying a P-TMSI and a GUTI to the target-side management NE, so as to request to register with the target-side management NE.

In step 202, the target-side management NE sends a Context Request message to an original-side homogeneous-system management NE.

After receiving the RAU Request message sent from the UE, the target-side management NE sends the Context Request message to the original-side homogeneous-system management NE, so as to request context information.

In this embodiment, before step 202, the target-side management NE performs protocol version detection with the original-side homogeneous-system management NE, so that the original-side homogeneous-system management NE acquires a GTP version of the target-side management NE. If the GTP version is an old version such as GTP V0 or GTP V1, the original-side homogeneous-system management NE acquires that the version information of the target-side management NE is a Pre-Rel-8 version, that is, the target-side management NE does not support interaction with an S-GW and does not support an ISR mechanism. In this embodiment and subsequent embodiments, the Pre-Rel-8 version is taken as an example for description; however, it can be understood that, in practical applications, the version information may also be other versions that do not support interaction with the S-GW and do not support the ISR mechanism.

The situation where the original-side homogeneous-system management NE acquires the version information of the target-side management NE by detecting the GTP information is introduced above. It can be understood that, the target-side management NE may also notify the version information thereof to the original-side homogeneous-system management NE through the Context Request message in step 202. In specific implementations, a field adapted to indicate the version information of the target-side management NE is extended in the Context Request message, or an identity adapted to indicate the version information is added in an existing field, or other indication methods are used.

The above description relates to explicit indication, that is, the target-side management NE indicates the version information thereof (that is, the target-side management NE does not support interaction with the S-GW and does not support the ISR mechanism) by using an explicit IE. It can be understood that, the target-side management NE may also indicate the version information thereof in an implicit manner. For example, if the target-side management NE does not carry a "version" field in a signaling sent to the original-side homogeneous-system management NE or the original-side heterogeneous-system management NE, or a value in the field is null, it indicates by default that the target-side management NE does not support interaction with the S-GW and does not support the ISR mechanism.

In step 203, the original-side homogeneous-system management NE sends a Context Response message to the target-side management NE, the Context Response message includes the context information.

In step 204, the target-side management NE sends a Context Ack message to the original-side homogeneous-system management NE.

In this embodiment, in addition to sending the version information of the target-side management NE to the original-side homogeneous-system management NE through the Context Request message in step 202, the target-side management NE may also send the version information thereof to the original-side homogeneous-system management NE through the Context Ack message in step 204, and the specific sending process is identical to that using the Context Request message, so the details will not be described herein again.

In step 205, the target-side management NE sends a message to a P-GW to update a bearer context.

In step 206, other RAU-related processes are executed.

In step 207, the original-side homogeneous-system management NE notifies the S-GW to delete the bearer.

In this embodiment, the original-side homogeneous-system management NE sends a delete bearer message to the S-GW, and the S-GW deletes a bearer context thereof and releases bearer resources according to the delete bearer message.

In step 208, the S-GW notifies the original-side heterogeneous-system management NE to delete a bearer context.

In this embodiment, since the original-side homogeneous-system management NE has acquired the version information of the target-side management NE from the target-side management NE through the GTP information, or the Context Request message in step 202, or the Context Ack message in step 204, the delete bearer message sent from the original-side homogeneous-system management NE to the S-GW in step 207 not only instructs the S-GW to delete the bearer thereof, but also instructs the S-GW to control the original-side heterogeneous-system management NE to delete the bearer context thereof.

Since the S-GW stores control-plane information of the original-side heterogeneous-system management NE, the S-GW sends the delete bearer message to the original-side heterogeneous-system management NE according to address information in the control-plane information, in which the delete bearer message is adapted to instruct the original-side heterogeneous-system management NE to delete the bearer context thereof.

After receiving the delete bearer message, the original-side heterogeneous-system management NE deletes the local bearer context related to the UE.

In step 209, the target-side management NE sends an RAU Accept message to the UE.

In step 210, the UE sends an RAU Complete message to the target-side management NE.

Figure 3:
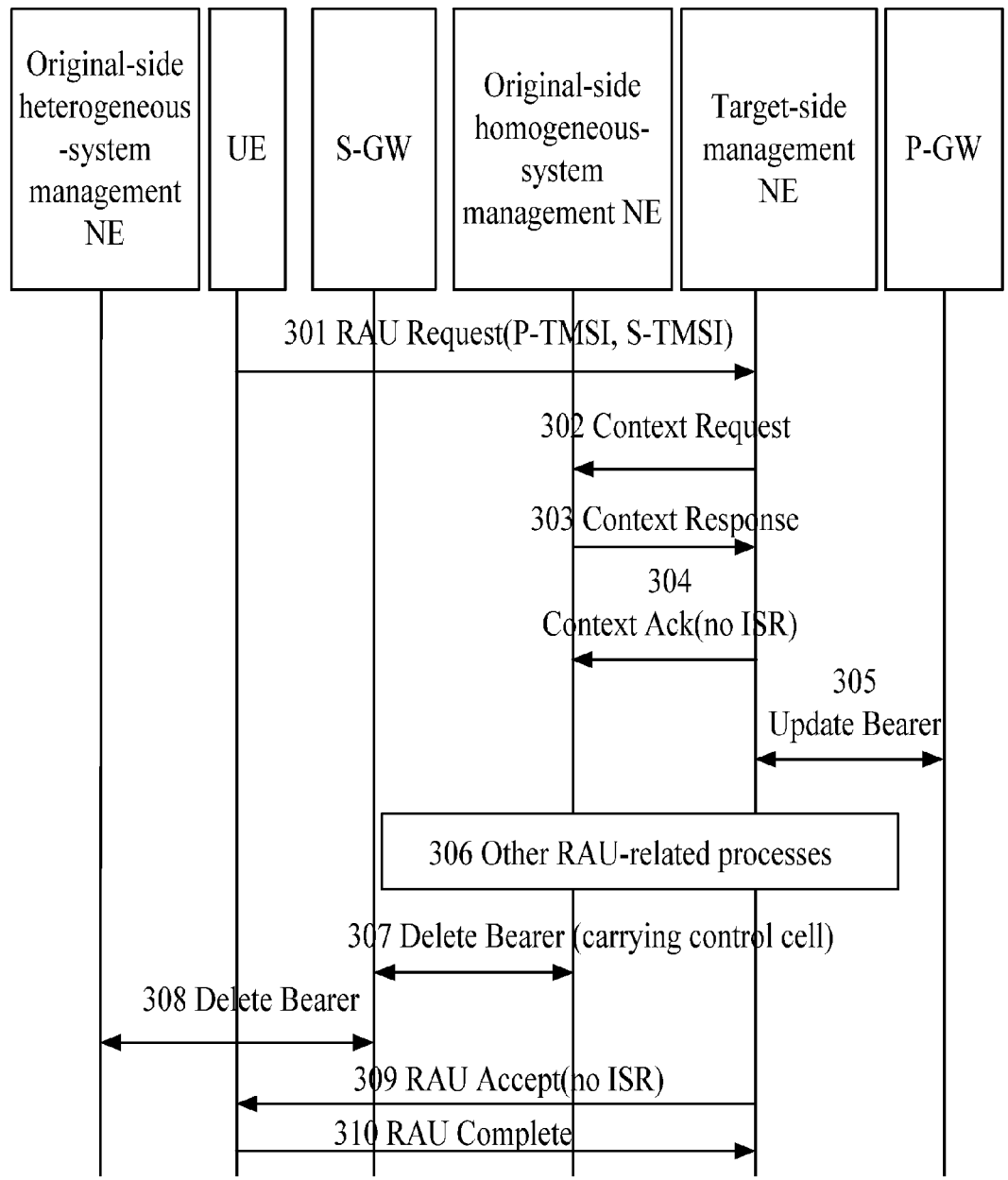
FIG. 3 is a flow chart of the resource release control method according to a third embodiment.

In this embodiment, the delete bearer message sent from the original-side homogeneous-system management NE to the S-GW requests by default the S-GW to control the original-side heterogeneous-system management NE to delete the bearer context thereof. It can be understood that, in practical applications, the original-side homogeneous-system management NE may also notify the S-GW to control the original-side heterogeneous-system management NE to delete the bearer context thereof in an explicit manner. Particularly, referring to FIG. 3, in the resource release control method according to a third embodiment, after acquiring the version information of the target-side management NE, the original-side homogeneous-system management NE sends a delete bearer message carrying a control IE to the S-GW, in which the control IE is adapted to instruct the S-GW to control the original-side heterogeneous-system management NE to delete the bearer context thereof.

The resource release control method according to the third embodiment includes the following steps.

In step 301, a UE sends an RAU Request message to the target-side management NE.

When the UE moves to the coverage of another MME or SGSN, the UE sends an RAU Request message carrying a P-TMSI and a GUTI to the target-side management NE, so as to request to register with the target-side management NE.

In step 302, the target-side management NE sends a Context Request message to an original-side homogeneous-system management NE.

After receiving the RAU Request message sent from the UE, the target-side management NE sends the Context Request message to the original-side homogeneous-system management NE, so as to request context information.

In this embodiment, before step 302, the target-side management NE performs protocol version detection with the original-side homogeneous-system management NE, so that the original-side homogeneous-system management NE acquires a GTP version of the target-side management NE. If the GTP version is an old version such as GTP V0 or GTP V1, the original-side homogeneous-system management NE acquires that the version information of the target-side management NE is a Pre-Rel-8 version, that is, the target-side management NE does not support interaction with an S-GW and does not support an ISR mechanism. In this embodiment and subsequent embodiments, the Pre-Rel-8 version is taken as an example for description; however, it can be understood that, in practical applications, the version information may also be other versions that do not support interaction with the S-GW and do not support the ISR mechanism.

The situation where the original-side homogeneous-system management NE acquires the version information of the target-side management NE by detecting the GTP information is introduced above. It can be understood that, the target-side management NE may also notify the version information thereof to the original-side homogeneous-system management NE through the Context Request message in step 302. In specific implementations, a field adapted to indicate the version information of the target-side management NE is extended in the Context Request message, or an identity adapted to indicate the version information is added in an existing field, or other indication methods are used.

The above description relates to explicit indication, that is, the target-side management NE indicates the version information thereof (that is, the target-side management NE does not support interaction with the S-GW and does not support the ISR mechanism) by using an explicit IE. It can be understood that, the target-side management NE may also indicate the version information thereof in an implicit manner. For example, if the target-side management NE does not carry a "version" field in a signaling sent to the original-side homogeneous-system management NE or the original-side heterogeneous-system management NE, or a value in the field is null, it indicates by default that the target-side management NE does not support interaction with the S-GW and does not support the ISR mechanism.

In step 303, the original-side homogeneous-system management NE sends a Context Response message to the target-side management NE, the Context Response message includes the context information.

In step 304, the target-side management NE sends a Context Ack message to the original-side homogeneous-system management NE.

In this embodiment, in addition to sending the version information of the target-side management NE to the original-side homogeneous-system management NE through the Context Request message in step 302, the target-side management NE may also send the version information thereof to the original-side homogeneous-system management NE through the Context Ack message in step 304, and the specific sending process is identical to that using the Context Request message, so the details will not be described herein again.

In step 305, the target-side management NE sends a message to a P-GW to update a bearer context.

In step 306, other RAU-related processes are executed.

In step 307, the original-side homogeneous-system management NE notifies the S-GW to delete the bearer.

In this embodiment, the original-side homogeneous-system management NE sends a delete bearer message carrying a control IE to the S-GW.

The S-GW deletes a bearer context thereof and releases the bearer resources according the delete bearer message.

After acquiring that the version information of the target-side management NE indicates that the target-side management NE does not support interaction with the S-GW and does not support the ISR mechanism, the original-side homogeneous-system management NE carries a control IE in the delete bearer message sent to the S-GW, in which the control IE is adapted to instruct the S-GW to delete the local bearer, and notify the original-side heterogeneous-system management NE to delete the bearer context thereof.

In step 308, the S-GW notifies the original-side heterogeneous-system management NE to delete a bearer context.

In this embodiment, since the original-side homogeneous-system management NE has acquired the version information of the target-side management NE from the target-side management NE through the GTP information, or the Context Request message in step 302, or the Context Ack message in step 304, the delete bearer message sent from the original-side homogeneous-system management NE to the S-GW in step 307 carries the control IE adapted to instruct the S-GW to notify the original-side heterogeneous-system management NE to delete the bearer context thereof.

Since the S-GW stores control-plane information of the original-side heterogeneous-system management NE, the S-GW sends the delete bearer message to the original-side heterogeneous-system management NE according to address information in the control-plane information, in which the delete bearer message is adapted to instruct the original-side heterogeneous-system management NE to delete the bearer context thereof.

After receiving the delete bearer message, the original-side heterogeneous-system management NE deletes the local bearer context related to the UE.

In step 309, the target-side management NE sends an RAU Accept message to the UE.

In step 310, the UE sends an RAU Complete message to the target-side management NE.

In this embodiment, the original-side homogeneous-system management NE notifies the S-GW to control the original-side heterogeneous-system management NE to delete the bearer context thereof in an explicit manner.

In the first embodiment, the original-side homogeneous-system management NE sends the delete bearer message to the original-side heterogeneous-system management NE according to the preset address information therein. It can be noted that, in practical applications, the address information may be acquired by the original-side homogeneous-system management NE in other manners. Two situations are introduced in the following.

Figure 4:
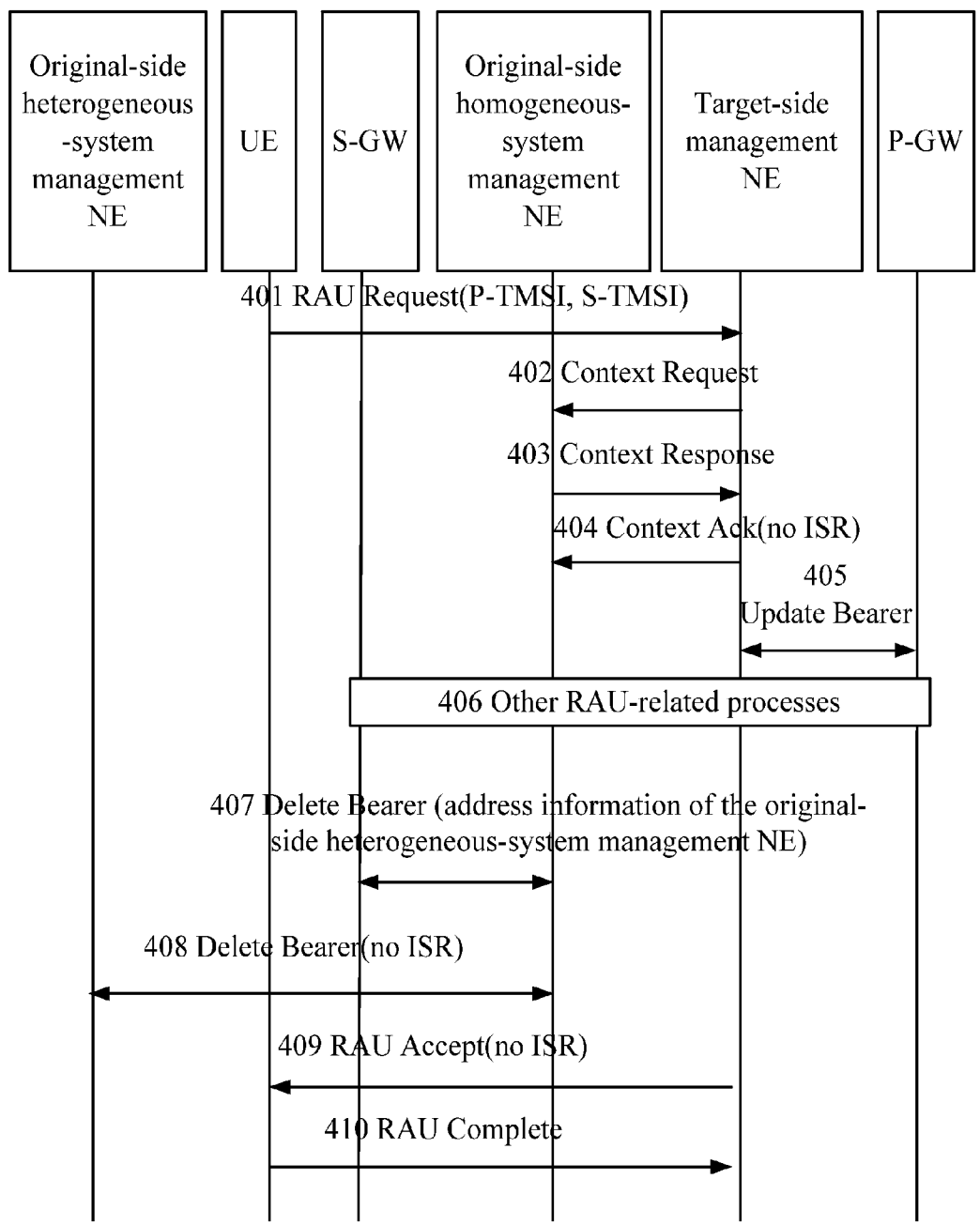
FIG. 4 is a flow chart of the resource release control method according to a fourth embodiment.

Referring to FIG. 4, in the resource release control method according to a fourth embodiment, the original-side homogeneous-system management NE interacts with the S-GW to instruct the S-GW to send the address information of the original-side heterogeneous-system management NE, and sends the delete bearer message to the corresponding original-side heterogeneous-system management NE according to the acquired address information.

The resource release control method according to the fourth embodiment includes the following steps.

In step 401, a UE sends an RAU Request message to the target-side management NE.

When the UE moves to the coverage of another MME or SGSN, the UE sends an RAU Request message carrying a P-TMSI and a GUTI to the target-side management NE, so as to request to register with the target-side management NE.

In step 402, the target-side management NE sends a Context Request message to an original-side homogeneous-system management NE.

After receiving the RAU Request message sent from the UE, the target-side management NE sends the Context Request message to the original-side homogeneous-system management NE, so as to request context information.

In this embodiment, before step 402, the target-side management NE performs protocol version detection with the original-side homogeneous-system management NE, so that the original-side homogeneous-system management NE acquires a GTP version of the target-side management NE. If the GTP version is an old version such as GTP V0 or GTP V1, the original-side homogeneous-system management NE acquires that the version information of the target-side management NE is a Pre-Rel-8 version, that is, the target-side management NE does not support interaction with an S-GW and does not support an ISR mechanism. In this embodiment and subsequent embodiments, the Pre-Rel-8 version is taken as an example for description; however, it can be understood that, in practical applications, the version information may also be other versions that do not support interaction with the S-GW and do not support the ISR mechanism.

The situation where the original-side homogeneous-system management NE acquires the version information of the target-side management NE by detecting the GTP information is introduced above. It can be understood that, the target-side management NE may also notify the version information thereof to the original-side homogeneous-system management NE through the Context Request message in step 402. In specific implementations, a field adapted to indicate the version information of the target-side management NE is extended in the Context Request message, or an identity adapted to indicate the version information is added in an existing field, or other indication methods are used.

The above description relates to explicit indication, that is, the target-side management NE indicates the version information thereof (i.e. the target-side management NE does not support interaction with the S-GW and does not support the ISR mechanism) by using an explicit IE. It can be understood that, the target-side management NE may also indicate the version information thereof in an implicit manner. For example, if the target-side management NE does not carry a "version" field in a signaling sent to the original-side homogeneous-system management NE or the original-side heterogeneous-system management NE, or a value in the field is null, it indicates by default that the target-side management NE does not support interaction with the S-GW and does not support the ISR mechanism.

In step 403, the original-side homogeneous-system management NE sends a Context Response message to the target-side management NE to send the context information.

In step 404, the target-side management NE sends a Context Ack message to the original-side homogeneous-system management NE.

In this embodiment, in addition to sending the version information of the target-side management NE to the original-side homogeneous-system management NE through the Context Request message in step 402, the target-side management NE may also send the version information thereof to the original-side homogeneous-system management NE through the Context Ack message in step 404, and the specific sending process is identical to that using the Context Request message, so the details will not be described herein again.

In step 405, the target-side management NE sends a message to a P-GW to update a bearer context.

In step 406, other RAU-related processes are executed.

In step 407, the original-side homogeneous-system management NE notifies the S-GW to delete the bearer.

In this embodiment, the original-side homogeneous-system management NE sends a delete bearer message to the S-GW, in which the delete bearer message carries an instruction adapted to instruct the S-GW to send control-plane information of the original-side heterogeneous-system management NE to the original-side homogeneous-system management NE.

After receiving the delete bearer message sent from the original-side homogeneous-system management NE, the S-GW deletes a bearer context thereof and releases bearer resources.

The S-GW acquires the control-plane information of the original-side heterogeneous-system management NE stored therein, in which the control-plane information includes address information, and carries the control-plane information when sending a delete bearer response to the original-side homogeneous-system management NE.

In step 408, the original-side homogeneous-system management NE notifies the original-side heterogeneous-system management NE to delete a bearer context.

In this embodiment, since the original-side homogeneous-system management NE has acquired the version information of the target-side management NE from the target-side management NE through the GTP information, or the Context Request message in step 402, or the Context Ack message in step 404, the original-side homogeneous-system management NE can notify the original-side heterogeneous-system management NE to delete the bearer context thereof.

In this embodiment, the original-side homogeneous-system management NE acquires the address information of the original-side heterogeneous-system management NE from the delete bearer response sent from the S-GW.

In this case, the original-side homogeneous-system management NE sends a delete bearer message to the original-side heterogeneous-system management NE according to the acquired address information of the original-side heterogeneous-system management NE. A cause value for deleting the bearer being "the target-side management NE does not support the ISR mechanism" may be carried in the delete bearer message.

It can be noted that, step 408 may be executed at an appropriate time after the Context Ack message sent from the target-side management NE is received, for example, when a timer times out, that is, a next process is not triggered in a preset period of time after the Context Ack message is received.

After receiving the delete bearer message, the original-side heterogeneous-system management NE deletes the local bearer context related to the UE.

In this embodiment, the original-side heterogeneous-system management NE may also notify the S-GW to delete the bearer.

It can be noted that, step 407 and step 408 may be implemented in combination, so as to delete the bearer context of the S-GW, and completely release the related bearer resources. For example, bearer resources may be allocated between the S-GW and the original-side homogeneous-system management NE, and likewise, bearer resources may also be allocated between the S-GW and the original-side heterogeneous-system management NE. If the delete bearer request in step 407 only requests the S-GW to release the bearer resources between the S-GW and the original-side homogeneous-system management NE, the original-side heterogeneous system can further notify the S-GW to delete the bearer context and release the bearer resources between the S-GW and the original-side heterogeneous-system management NE in step 408. It can be understood that, if no bearer resources are allocated between the S-GW and the original-side heterogeneous system, and the S-GW has deleted the bearer context thereof and released the bearer between the S-GW and the original-side homogeneous-system management NE according to the instruction in step 407, the original-side heterogeneous-system management NE may not notify the S-GW to delete the bearer in step 408.

In step 409, the target-side management NE sends an RAU Accept message to the UE.

In step 410, the UE sends an RAU Complete message to the target-side management NE.

Figure 5:
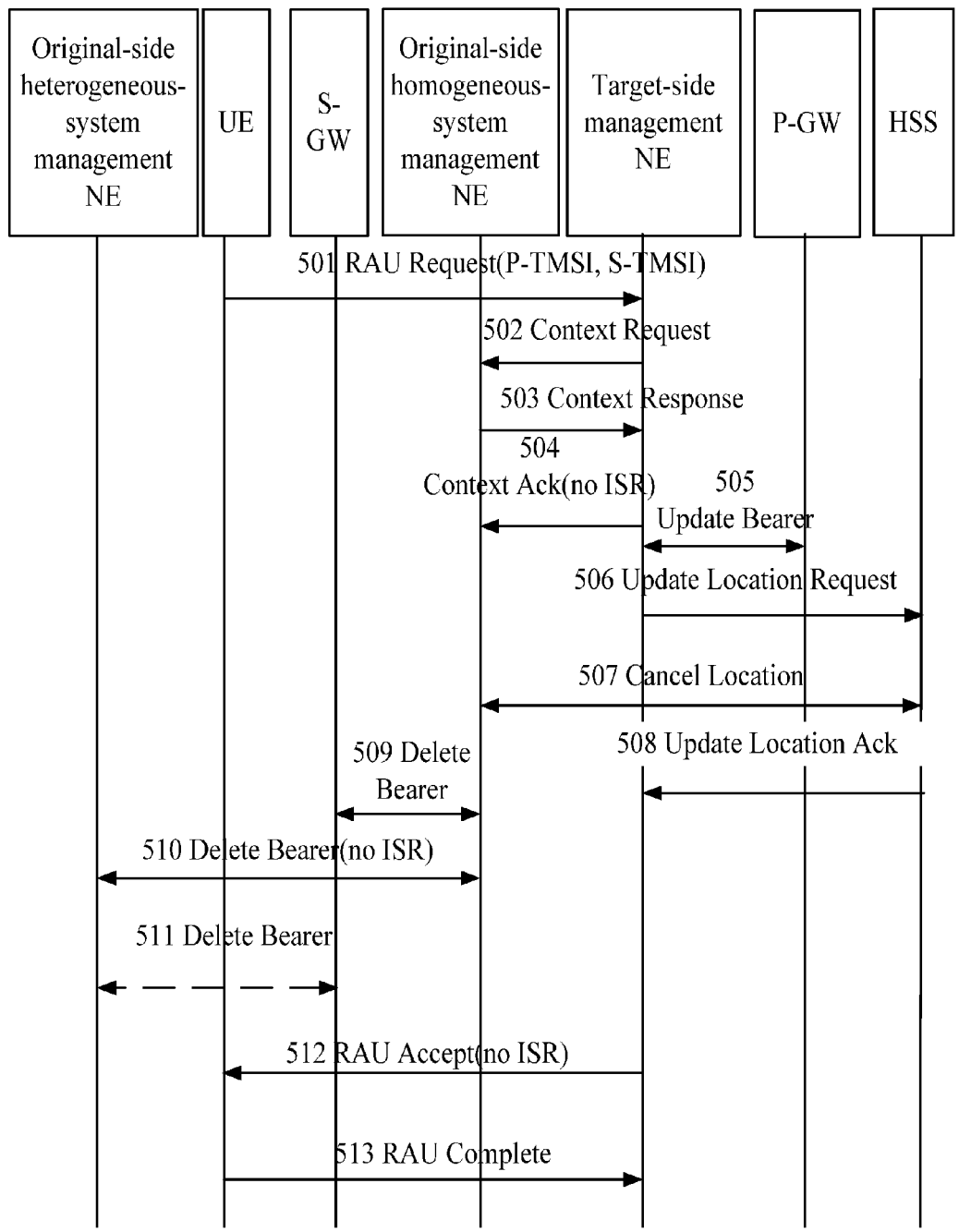
FIG. 5 is a flow chart of the resource release control method according to a fifth embodiment.

In this embodiment, the original-side homogeneous-system management NE acquires the address information of the original-side heterogeneous-system management NE through the S-GW, and thus can send the delete bearer message to the corresponding original-side heterogeneous-system management NE according to the address information. It can be understood that, the original-side homogeneous-system management NE may also acquire the address information of the original-side heterogeneous-system management NE from other NEs. Specifically, referring to FIG. 5, in the resource release control method according to a fifth embodiment, the original-side homogeneous-system management NE acquires the address information of the original-side heterogeneous-system management NE from an HSS.

The resource release control method according to the fifth embodiment particularly includes the following steps.

In step 501, a UE sends an RAU Request message to the target-side management NE.

When the UE moves to the coverage of another MME or SGSN, the UE sends an RAU Request message carrying a P-TMSI and a GUTI to the target-side management NE, so as to request to register with the target-side management NE.

In step 502, the target-side management NE sends a Context Request message to an original-side homogeneous-system management NE.

After receiving the RAU Request message sent from the UE, the target-side management NE sends the Context Request message to the original-side homogeneous-system management NE, so as to request context information.

In this embodiment, before step 502, the target-side management NE performs protocol version detection with the original-side homogeneous-system management NE, so that the original-side homogeneous-system management NE acquires a GTP version of the target-side management NE. If the GTP version is an old version such as GTP V0 or GTP V1, the original-side homogeneous-system management NE acquires that the version information of the target-side management NE is a Pre-Rel-8 version, that is, the target-side management NE does not support interaction with an S-GW and does not support an ISR mechanism. In this embodiment and subsequent embodiments, the Pre-Rel-8 version is taken as an example for description; however, it can be understood that, in practical applications, the version information may also be other versions that do not support interaction with the S-GW and do not support the ISR mechanism.

The situation where the original-side homogeneous-system management NE acquires the version information of the target-side management NE by detecting the GTP information is introduced above. It can be understood that, the target-side management NE may also notify the version information thereof to the original-side homogeneous-system management NE through the Context Request message in step 502. In specific implementations, a field adapted to indicate the version information of the target-side management NE is extended in the Context Request message, or an identity adapted to indicate the version information is added in an existing field, or other indication methods are used.

The above description relates to explicit indication, that is, the target-side management NE indicates the version information thereof (that is, the target-side management NE does not support interaction with the S-GW and does not support the ISR mechanism) by using an explicit IE. It can be understood that, the target-side management NE may also indicate the version information thereof in an implicit manner. For example, if the target-side management NE does not carry a "version" field in a signaling sent to the original-side homogeneous-system management NE or the original-side heterogeneous-system management NE, or a value in the field is null, it indicates by default that the target-side management NE does not support interaction with the S-GW and does not support the ISR mechanism.

In step 503, the original-side homogeneous-system management NE sends a Context Response message to the target-side management NE, the Context Response message includes the context information.

In step 504, the target-side management NE sends a Context Ack message to the original-side homogeneous-system management NE.

In this embodiment, in addition to sending the version information of the target-side management NE to the original-side homogeneous-system management NE through the Context Request message in step 502, the target-side management NE may also send the version information thereof to the original-side homogeneous-system management NE through the Context Ack message in step 504, and the specific sending process is identical to that using the Context Request message, so the details will not be described herein again.

In step 505, the target-side management NE sends a message to a P-GW to update a bearer context.

In step 506, the target-side management NE sends an Update Location Request message to the HSS.

In this embodiment, in step 506, the target-side management NE sends the version information of the target-side management NE to the HSS through the Update Location Request message. In a specific implementation, a field adapted to indicate the version information of the target-side management NE is extended in the Update Location Request message.

In step 507, the HSS sends a Cancel Location message to the original-side homogeneous-system management NE.

In this embodiment, when the HSS acquires that the Update Location Request message carries the version information of the target-side management NE, the HSS is triggered to send control-plane information of the original-side heterogeneous-system management NE to the original-side homogeneous-system management NE. In a specific implementation, a field adapted to store the control-plane information (including the address information) of the original-side heterogeneous-system management NE is extended in the Cancel Location message.

In addition to the above triggering method, the original-side homogeneous-system management NE may also add a new interaction signaling such as an ISR Information Request adapted to instruct the HSS to send the control-plane information of the original-side heterogeneous-system management NE, so that after receiving the signaling, the HSS acquires the control-plane information of the original-side heterogeneous-system management NE, and sends the control-plane information of the original-side heterogeneous-system management NE to the original-side homogeneous-system management NE by carrying the control-plane information of the original-side heterogeneous-system management NE in an ISR Information Response.

In step 508, the HSS sends an Update Location Ack message to the target-side management NE.

In step 509, the original-side homogeneous-system management NE notifies the S-GW to delete the bearer.

In this embodiment, the original-side homogeneous-system management NE sends a delete bearer message to the S-GW, in which the delete bearer message instructs the S-GW to delete the bearer thereof. It can be noted that, in this embodiment, the operation that the S-GW deletes the bearer thereof refers to that the S-GW deletes a bearer context thereof and releases bearer resources.

After receiving the delete bearer message sent from the original-side homogeneous-system management NE, the S-GW deletes the bearer context thereof and releases the bearer resources.

In step 510, the original-side homogeneous-system management NE notifies the original-side heterogeneous-system management NE to delete a bearer context.

In this embodiment, since the original-side homogeneous-system management NE has acquired the version information of the target-side management NE from the target-side management NE through the GTP information, or the Context Request message in step 502, or the Context Ack message in step 504, the original-side homogeneous-system management NE can notify the original-side heterogeneous-system management NE to delete the bearer context thereof.

In this embodiment, the original-side homogeneous-system management NE acquires the address information of the original-side heterogeneous-system management NE from the information sent from the HSS.

In this case, the original-side homogeneous-system management NE sends a delete bearer message to the original-side heterogeneous-system management NE according to the acquired address information of the original-side heterogeneous-system management NE. A cause value for deleting the bearer being "the target-side management NE does not support the ISR mechanism" may be carried in the delete bearer message.

It can be noted that, step 510 may be executed at an appropriate time after the Context Ack message sent from the target-side management NE is received, for example, when a timer times out, that is, a next process is not triggered in a preset period of time after the Context Ack message is received.

In step 511, the original-side heterogeneous-system management NE deletes a local bearer related to the UE.

After receiving the delete bearer message, the original-side heterogeneous-system management NE deletes the local bearer context related to the UE.

In this embodiment, the original-side heterogeneous-system management NE may also notify the S-GW to delete the bearer context.

It can be noted that, step 509 and step 511 may be implemented in combination, so as to delete the bearer context of the S-GW, and completely release the related bearer resources. For example, bearer resources may be allocated between the S-GW and the original-side homogeneous-system management NE, and likewise, bearer resources may also be allocated between the S-GW and the original-side heterogeneous-system management NE. If the delete bearer request in step 509 only requests the S-GW to release the bearer resources between the S-GW and the original-side homogeneous-system management NE, the original-side heterogeneous system can further notify the S-GW to delete the bearer context and release the bearer resources between the S-GW and the original-side heterogeneous-system management NE in step 511. It can be understood that, if no bearer resources are allocated between the S-GW and the original-side heterogeneous system, and the S-GW has deleted the bearer context thereof and released the bearer between the S-GW and the original-side homogeneous-system management NE according to the instruction in step 507, the original-side heterogeneous-system management NE may not notify the S-GW to delete the bearer in step 511.

In step 512, the target-side management NE sends an RAU Accept message to the UE.

In step 513, the UE sends an RAU Complete message to the target-side management NE.

In this embodiment, the original-side homogeneous-system management NE acquires the address information of the original-side heterogeneous-system management NE through the HSS, and thus can send the delete bearer message to the original-side heterogeneous-system management NE.

Figure 6:
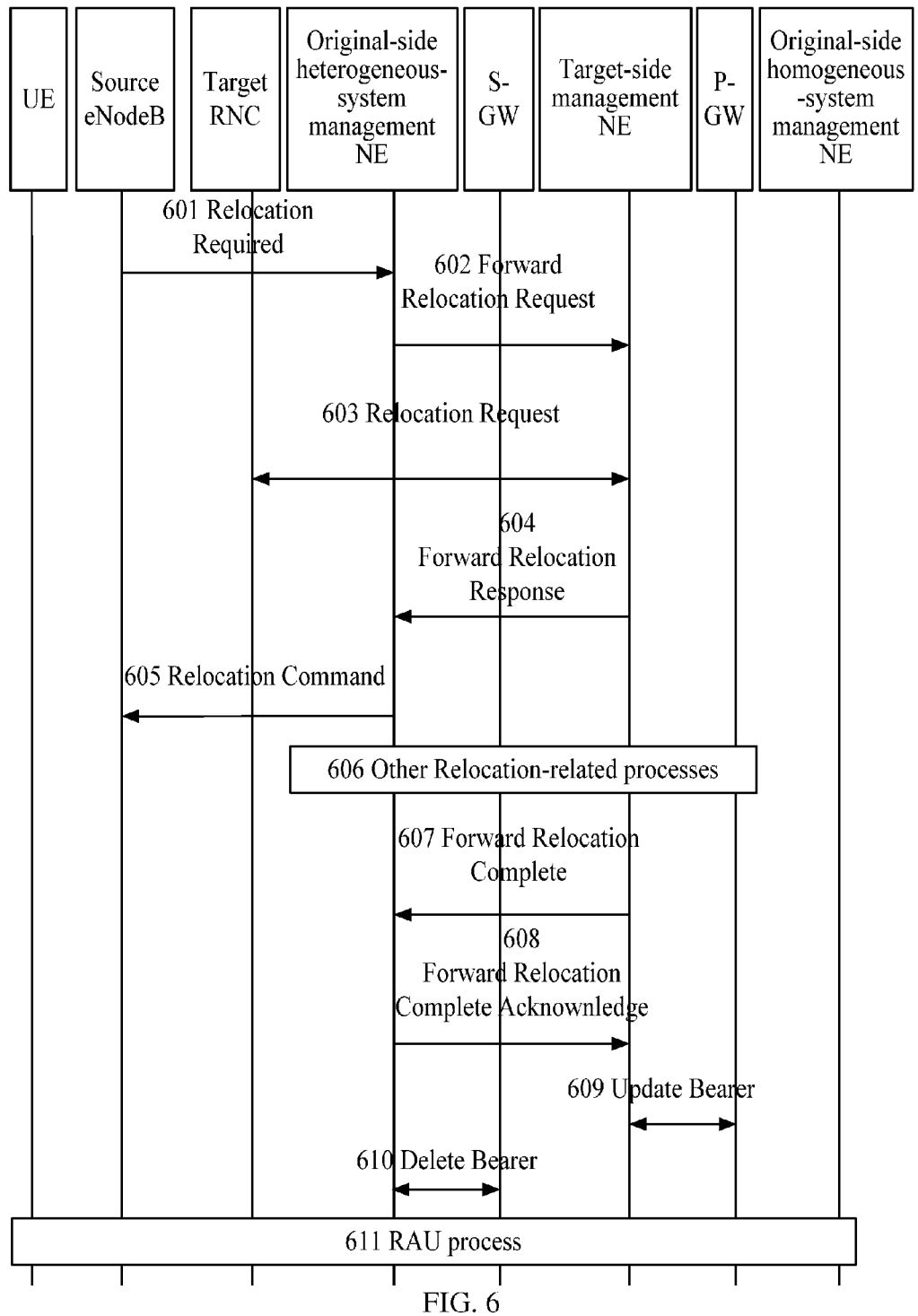
FIG. 6 is a flow chart of the resource release control method according to a sixth embodiment.

In the above five embodiments, the RAU process is taken as an example for description; however, in practical applications, other processes may also be used. In the following, a HANDOVER process is taken as an example for description. Referring to FIG. 6, in the resource release control method according to a sixth, the original-side heterogeneous-system management NE acquires the version information of the target-side management NE, so that if the original-side heterogeneous-system management NE determines that the target-side management NE does not support interaction with the S-GW and does not support the ISR mechanism, the original-side heterogeneous-system management NE deletes the bearer context thereof.

The resource release control method according to the sixth embodiment includes the following steps.

In step 601, a Source eNodeB sends a Relocation Required to the original-side heterogeneous-system management NE.

In step 602, the original-side heterogeneous-system management NE sends a Forward Relocation Request message to a target-side management NE.

In step 603, the target-side management NE sends a Relocation Request to a target radio network controller (RNC), so as to request the target RNC to allocate radio resources.

In step 604, the target-side management NE sends a Forward Relocation Response message to the original-side heterogeneous-system management NE.

In this embodiment, the Forward Relocation Response message sent from the target-side management NE to the original-side heterogeneous-system management NE carries the version information of the target-side management NE. In a specific implementation, a field adapted to carry the version information is extended in the Forward Relocation Response message, or the version information is added in an existing field.

In step 605, the original-side heterogeneous-system management NE sends a Relocation Command message to the Source eNodeB.

In step 606, other Relocation-related processes are executed.

In step 607, after the Relocation is completed, the target-side management NE sends a Forward Relocation Complete message to the original-side heterogeneous-system management NE.

In this embodiment, in addition to sending the version information of the target-side management NE to the original-side heterogeneous-system management NE through the Forward Relocation Response message in step 604, the target-side management NE may also send the version information of the target-side management NE to the original-side heterogeneous-system management NE through the Forward Relocation Complete message in step 607, and the specific sending process is identical to that in step 604.

The above description relates to explicit indication, that is, the target-side management NE indicates the version information thereof (that is, the target-side management NE does not support interaction with the S-GW and does not support the ISR mechanism) by using an explicit IE. It can be understood that, the target-side management NE may also indicate the version information thereof in an implicit manner. For example, if the target-side management NE does not carry a "version" field in a signaling sent to the original-side homogeneous-system management NE or the original-side heterogeneous-system management NE, or a value in the field is null, it indicates by default that the target-side management NE does not support interaction with the S-GW and does not support the ISR mechanism.

In step 608, after receiving the message, the original-side heterogeneous-system management NE sends a Forward Relocation Complete Acknowledge message to the target-side management NE.

In step 609, the target-side management NE sends a message to a P-GW to update bearer information.

In step 610, the original-side heterogeneous-system management NE deletes the bearer context. In step 611, RAU process proceeds.

In this embodiment, since the original-side heterogeneous-system management NE acquires the version information of the target-side management NE through step 604 or 607, and acquires that the version information indicates that the target-side management NE does not support interaction with the S-GW and does not support the ISR mechanism, the original-side heterogeneous-system management NE deletes the local bearer context and notifies the S-GW to delete the local bearer, and after receiving the instruction of the original-side heterogeneous-system management NE, the S-GW deletes the bearer context thereof and releases bearer resources.

In step 610, the original-side heterogeneous-system management NE may delete the bearer context at an appropriate time after receiving the Forward Relocation Complete message sent from the target-side management NE. For example, if a next process is not triggered by any message in a preset period of time after the Forward Relocation Complete message is received, the original-side heterogeneous-system management NE deletes the bearer context.

In this embodiment, the original-side heterogeneous-system management NE acquires the version information of the target-side management NE from the target-side management NE, and deletes the local bearer context after determining that the version information indicates that the target-side management NE does not support interaction with the S-GW and does not support the ISR mechanism.

Another implementation under the HANDOVER process is introduced in the following.

Figure 7:
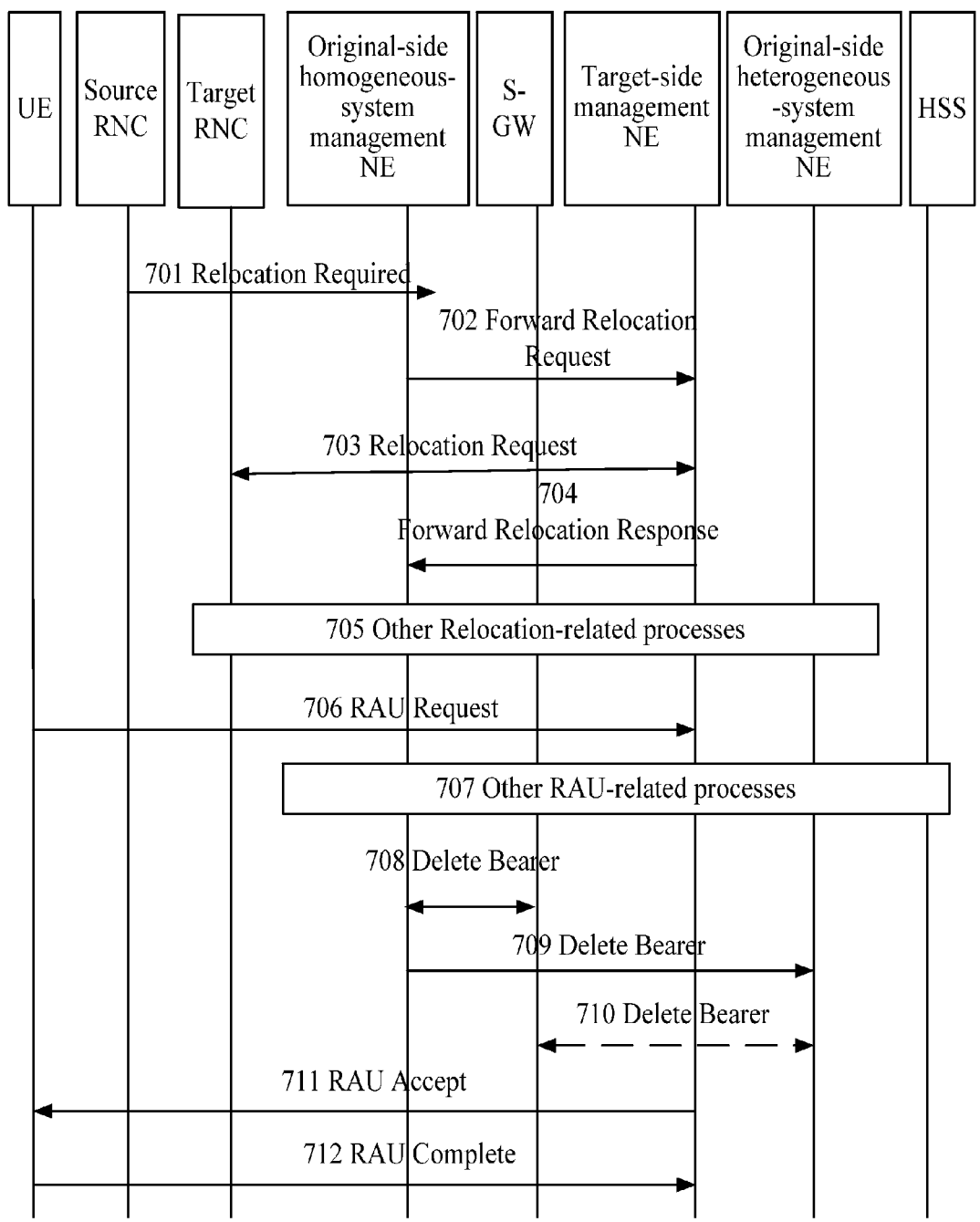
FIG. 7 is a flow chart of the resource release control method according to a seventh embodiment.

Referring to FIG. 7, in the resource release control method according to a seventh embodiment, the original-side homogeneous-system management NE acquires the version information of the target-side management NE, and directly sends the delete bearer message to the original-side heterogeneous-system management NE, or sends the delete bearer message to the original-side heterogeneous-system management NE through the S-GW.

The resource release control method according to the seventh embodiment includes the following steps.

In step 701, a source RNC sends a Relocation Required to the original-side homogeneous-system management NE.

In step 702, the original-side homogeneous-system management NE sends a Forward Relocation Request message to a target-side management NE.

In step 703, the target-side management NE sends a Relocation Request to a target RNC, so as to request the target RNC to allocate radio resources.

In step 704, the target-side management NE sends a Forward Relocation Response message to the original-side homogeneous-system management NE.

In this embodiment, the Forward Relocation Response message sent from the target-side management NE to the original-side homogeneous-system management NE carries the version information of the target-side management NE. In a specific implementation, a field adapted to carry the version information is extended in the Forward Relocation Response message, or the version information is added in an existing field.

The above description relates to explicit indication, that is, the target-side management NE indicates the version information thereof (that is, the target-side management NE does not support interaction with the S-GW and does not support the ISR mechanism) by using an explicit IE. It can be understood that, the target-side management NE may also indicate the version information thereof in an implicit manner. For example, if the target-side management NE does not carry a "version" field in a signaling sent to the original-side homogeneous-system management NE or the original-side heterogeneous-system management NE, or a value in the field is null, it indicates by default that the target-side management NE does not support interaction with the S-GW and does not support the ISR mechanism.

In step 705, other Relocation-related processes are executed.

In step 706, a UE sends an RAU request to the target-side management NE.

In step 707, other RAU-related processes are executed.

In this embodiment, specifically, other RAU-related processes may be that the target-side management NE interacts with an HSS to perform location update, and the HSS interacts with the original-side homogeneous-system management NE to cancel the registration of the original-side homogeneous-system management NE with the HSS.

In steps 708 to 710, the bearer context of the original-side heterogeneous-system management NE is deleted.

In this embodiment, after acquiring the version information of the target-side management NE, the original-side homogeneous-system management NE sends a delete bearer message to the original-side heterogeneous-system management NE, and address information of the original-side heterogeneous-system management NE may be preset in the original-side homogeneous-system management NE, or acquired from the S-GW or the HSS. The specific acquisition process is similar to the acquisition process in the above embodiments, so the details will not be described herein again.

In addition, the original-side homogeneous-system management NE may also instruct the S-GW to delete the bearer context of the original-side heterogeneous-system management NE. The specific processing is similar to the instruction process in the above embodiments, so the details will not be described herein again.

In step 711, the target-side management NE sends an RAU Accept message to the UE.

In step 712, the UE sends an RAU Complete message to the target-side management NE.

In this embodiment, after acquiring the version information of the target-side management NE, the original-side homogeneous-system management NE directly sends the delete bearer message to the original-side heterogeneous-system management NE, or sends the delete bearer message to the original-side heterogeneous-system management NE through the S-GW.

In this embodiment, the S-GW can delete the local bearer, that is, can delete the bearer context thereof and release the bearer resources. The specific deletion process is similar to the deletion process in the above embodiments, so the details will not be described herein again.

In the above embodiments, after acquiring the version information of the target-side management NE, and determining that the version information indicates that the target-side management NE does not interact with the S-GW and does not support the ISR mechanism, the original-side homogeneous-system management NE or the original-side heterogeneous-system management NE deletes the bearer context of the original-side heterogeneous-system management NE according to the version information. Therefore, the embodiments enable deletion of the bearer context of the original-side heterogeneous-system management NE, even if the target-side management NE does not support interaction with the S-GW and does not support the ISR mechanism.

Figure 8:
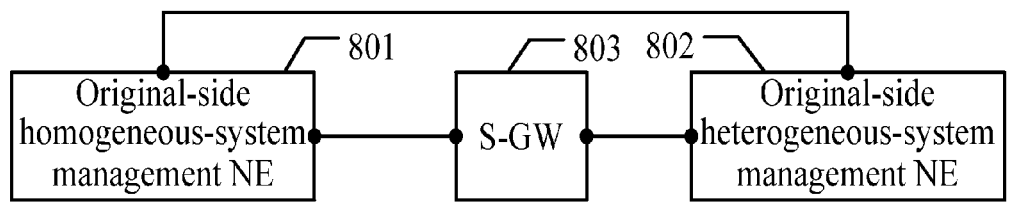
FIG. 8 is a schematic view of a communication system according to an embodiment.

An embodiment of a communication system is introduced in the following. Referring to FIG. 8, the communication system includes an original-side homogeneous-system management NE 801 and an original-side heterogeneous-system management NE 802.

The original-side homogeneous-system management NE 801 is configured to determine version information of a target-side management NE when a UE activating an ISR mechanism is handed over from an original-side network to a target-side network, and configured to send a delete bearer message if a determination result indicates that the target-side management NE does not interact with an S-GW and does not support the ISR mechanism.

The original-side heterogeneous-system management NE 802 is configured to receive the delete bearer message, and delete a bearer context thereof according to the delete bearer message.

In this embodiment, after acquiring the version information of the target-side management NE, the original-side homogeneous-system management NE 801 directly sends the delete bearer message to the original-side heterogeneous-system management NE 802 according to the preset address information of the original-side heterogeneous-system management NE 802, so that the original-side heterogeneous-system management NE 802 can delete the local bearer context.

It can be understood that, the original-side homogeneous-system management NE 801 may also acquire the address information of the original-side heterogeneous-system management NE 802 through the S-GW or an HSS, and send the delete bearer message to the corresponding original-side heterogeneous-system management NE 802 according to the acquired address information, so that the original-side heterogeneous-system management NE 802 can delete the local bearer context.

In addition to directly sending the delete bearer message to the original-side heterogeneous-system management NE 802, the original-side homogeneous-system management NE 801 may also send the delete bearer message to the original-side heterogeneous-system management NE 802 through the S-GW. In this case, this embodiment of the communication system further includes an S-GW 803.

The S-GW 803 is configured to receive the delete bearer message sent from the original-side homogeneous-system management NE 801, delete a bearer context thereof according to the delete bearer message, release bearer resources, and send the delete bearer message to the original-side heterogeneous-system management NE 802.

Specifically, the delete bearer message received by the S-GW 803 from the original-side homogeneous-system management NE 801 further includes a control IE configured to instruct the S-GW 803 to notify the original-side heterogeneous-system management NE 802 to delete the bearer context.

Figure 9:
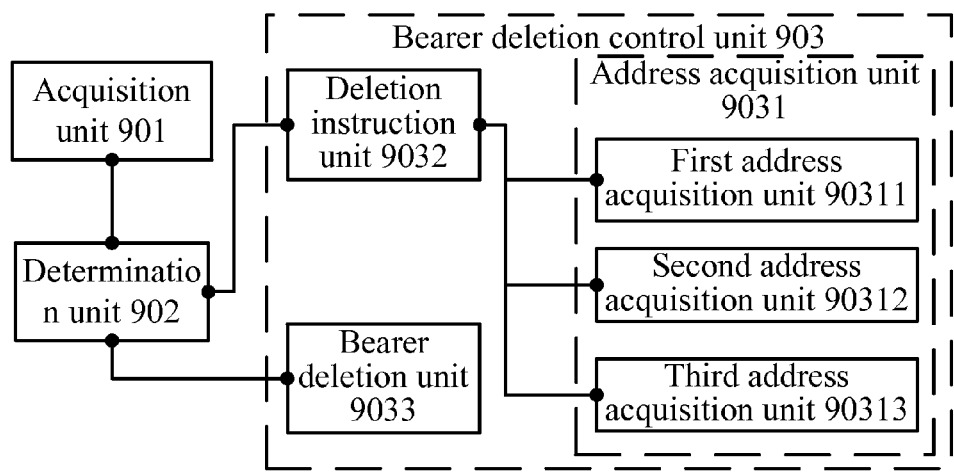
FIG. 9 is a schematic view of a mobility management NE according to an embodiment.

Referring to FIG. 9, a first embodiment of a mobility management NE includes an acquisition unit 901, a determination unit 902, and a bearer deletion control unit 903.

The acquisition unit 901 is configured to acquire version information of a peer-end management NE.

The determination unit 902 is configured to determine whether the version information of the peer-end management NE acquired by the acquisition unit 901 indicates that the peer-end management NE does not support interaction with an S-GW and does not support an ISR mechanism.

The bearer deletion control unit 903 is configured to execute a bearer deletion process if a determination result of the determination unit 902 is that the peer-end management NE does not support interaction with the S-GW and does not support the ISR mechanism.

In this embodiment, the peer-end management NE refers to a target-side management NE.

In this embodiment, the bearer deletion control unit 903 may be implemented in two manners.

In a first manner, the bearer deletion control unit 903 includes an address acquisition unit 9031 and a deletion instruction unit 9032.

The address acquisition unit 9031 is configured to acquire address information of an original-side heterogeneous-system management NE.

The deletion instruction unit 9032 is configured to send a delete bearer message to the corresponding original-side heterogeneous-system management NE according to the version information and the address information, in which the delete bearer message is configured to instruct the original-side heterogeneous-system management NE to delete a bearer context of the original-side heterogeneous-system management NE.

In this manner, the mobility management NE may be an original-side homogeneous-system management NE.

In a second manner, the bearer deletion control unit 903 includes a bearer deletion unit 9033.

The bearer deletion unit 9033 is configured to delete the bearer context of the mobility management NE according to the version information.

In this manner, the mobility management NE may be an original-side heterogeneous-system management NE.

The address acquisition unit 9031 in this embodiment includes at least one of a first address acquisition unit 90311, a second address acquisition unit 90312, and a third address acquisition unit 90313.

The first address acquisition unit 90311 is configured to acquire preset address information of the original-side heterogeneous-system management NE.

The second address acquisition unit 90312 is configured to acquire the address information of the original-side heterogeneous-system management NE from the S-GW.

The third address acquisition unit 90313 is configured to acquire the address information of the original-side heterogeneous-system management NE from an HSS.

Figure 10:
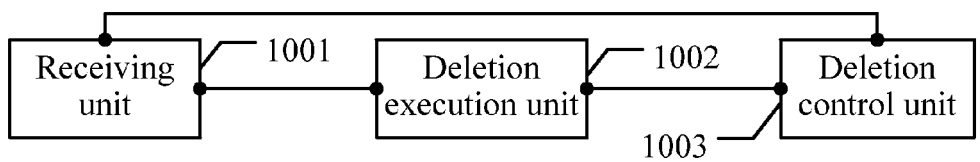

Referring to FIG. 10, a GW device according to an embodiment includes a receiving unit 1001, a deletion execution unit 1002, and a deletion control unit 1003.

The receiving unit 1001 is configured to receive a delete bearer message sent from an original-side homogeneous-system management NE.

The deletion execution unit 1002 is configured to delete a bearer context of the GW device according to the delete bearer message, and release bearer resources.

The deletion control unit 1003 is configured to send the delete bearer message to an original-side heterogeneous-system management NE, in which the delete bearer message is configured to instruct the original-side heterogeneous-system management NE to delete a bearer context.

In this embodiment, the deletion execution unit 1002 is an optional unit.

Persons of ordinary skill in the art can understand that all or a part of the steps in the method according to the embodiments may be implemented by a program instructing relevant hardware. The program may be stored in a computer readable storage medium. When the program is run, the following steps are performed: acquiring version information of a target-side management NE, when a UE activating an ISR mechanism is handed over from an original-side network to a target-side network; and deleting a bearer of an original-side heterogeneous-system management NE, if the version information indicates that the target-side management NE does not interact with an S-GW and does not support the ISR mechanism.

The storage medium may be a ROM, a magnetic disk, an optical disk, or the like.

The method, communication system, and device for resource release control according to the embodiments of present application are described in detail above. It is understood that persons of ordinary skill may make variations to the described embodiments with departing from the scope of the claims. Moreover, it is understood that the scope of the claims is not limited to any particular embodiment, described above.

What is claimed is:

1. A method, comprising:
   acquiring, by a first Serving General Packet Radio Service (GPRS) Supporting Node (SGSN) in a source network, version information of a second SGSN in a target network when a User Equipment (UE) activating an Idle mode Signaling Reduction (ISR) mechanism moves from the source network to the target network;
   determining, by the first SGSN, the second SGSN does not communicate with a Serving Gateway (S-GW) and does not support the ISR mechanism according to the version information of the second SGSN;
   sending, by the first SGSN, a first delete bearer message to the S-GW;
   deleting, by the S-GW, bearer resources on the S-GW after receiving the first delete bearer message; and
   indicating, by the S-GW, a Mobility Management Entity (MME) in the source network to delete the bearer resources on the MME by sending a second delete bearer message to the MME,
   wherein acquiring, by the first SGSN in the source network, the version information of the second SGSN in the target network, comprises:
   receiving by the first SGSN a context request message sent from the second SGSN which carries the version information of the second SGSN; and
   acquiring, by the first SGSN, the version information of the second SGSN according to the context request message.

2. The method according to claim 1, wherein the first delete bearer message comprises a control information entity (IE), the control IE is configured to instruct the S-GW to send the second delete bearer message to the MME.

3. A method, comprising:
   acquiring by a first Serving General Packet Radio Service (GPRS) Supporting Node (SGSN) in a source network, version information of a second SGSN in a target network when a User Equipment (UE) activating an Idle mode Signaling Reduction (ISR) mechanism moves from the source network to the target network;
   determining, by the first SGSN, the second SGSN does not communicate with a Serving Gateway S-GW and does not su port the ISR mechanism according to the version information of the second SGSN;
   sending, by the first SGSN, a first delete bearer message to the S-GW;
   deleting, by the S-GW, bearer resources on the S-GW after receiving the first delete bearer message; and
   indicating, by the S-GW, a Mobility Management Entity (MME) in the source network to delete the bearer resources on the MME by sending a second delete bearer message to the MME
   wherein acquiring, by the first SGSN in the source network, the version information of the second SGSN in the target network, comprises:
   receiving, by the first SGSN, a context acknowledge (Ack) message sent from the second SGSN, which carries the version information of the second SGSN; and
   acquiring, by the first SGSN, the version information of the second SGSN according to the context Ack message.

4. The method of claim 3, wherein the first delete bearer message comprises a control information entity (IE), the control IE is configured to instruct the S-GW to send the second delete bearer message to the MME.

5. A communication system, comprising:
   a first Serving General Packet Radio Service (GPRS) Supporting Node (SGSN) in a source network and a Serving Gateway (S-GW),
   the first SGSN, configured to acquire version information of a second SGSN in a target network, when a User Equipment (UE) activating an Idle mode Signaling Reduction (ISR) mechanism moves from the source network to the target network, determine the second SGSN does not communicate with the S-GW and does not support the ISR mechanism according to the version information of the second SGSN; and send a first delete bearer message to the S-GW;

the S-GW, configured to delete bearer resources on the S-GW after receiving the first delete bearer message sent from the first SGSN, and indicate a Mobility Management Entity (MME) in the source network to delete the bearer resources on the MME by sending a second delete bearer message, wherein the first SGSN is configured to receive a context request message sent from the second SGSN, the context request message carrying the version information of the second SGSN, and acquire the version information of the second SGSN according to the context request message.

6. The system of claim 5, wherein the first delete bearer message comprises a control information entity (IE), the control IE is configured to instruct the S-GW to send the second delete bearer message to the MME.

7. A communication system, comprising a first Serving General Packet Radio Service (GPRS) Supporting Node (SGSN) in a source network and a Serving Gateway (S-GW), the first SGSN, configured to acquire version information of a second SGSN in a target network, when a User Equipment (UE) activating an Idle mode Signaling Reduction (ISR) mechanism moves from the source network to the target network, determine the second SGSN does not communicate with the S-GW and does not support the ISR mechanism according to the version information of the second SGSN; and send a first delete bearer message to the S-GW;

the S-GW, configured to delete bearer resources on the S-GW after receiving the first delete bearer message sent from the first SGSN, and indicate a Mobility Management Entity (MME) in the source network to delete the bearer resources on the MME by sending a second delete bearer message, the first SGSN, configured to receive a context acknowledge (Ack) message sent from the second SGSN, which carries the version information of the second SGSN, and acquire the version information of the second SGSN according to the context Ack message.

8. The system of claim 7, wherein the first delete bearer message comprises a control information entity (IE), the control IE is configured to instruct the S-GW to send the second delete bearer message to the MME.

* * * * *

UNITED STATES PATENT AND TRADEMARK OFFICE
CERTIFICATE OF CORRECTION

| | | |
|---|---|---|
| PATENT NO. | : 8,144,665 B2 | Page 1 of 1 |
| APPLICATION NO. | : 13/182274 | |
| DATED | : March 27, 2012 | |
| INVENTOR(S) | : Hu et al. | |

It is certified that error appears in the above-identified patent and that said Letters Patent is hereby corrected as shown below:

Column 22, line 33, "su port" should read -- support --.

Signed and Sealed this
Fourteenth Day of August, 2012

David J. Kappos
*Director of the United States Patent and Trademark Office*